United States Patent
Lang et al.

(10) Patent No.: US 7,048,395 B2
(45) Date of Patent: May 23, 2006

(54) DETENT JOINT

(75) Inventors: Heinrich Lang, Ergersheim (DE); Wolfgang Seiboth, Bad Windsheim (DE); Georg Hecht, Weihenzell (DE); Stefan Centmayer, Ergersheim (DE)

(73) Assignee: Lang Mekra North America, Ridgeway, SC (US)

( * ) Notice: Subject to any disclaimer, the term of this patent is extended or adjusted under 35 U.S.C. 154(b) by 224 days.

(21) Appl. No.: 10/798,098

(22) Filed: Mar. 11, 2004

(65) Prior Publication Data
US 2005/0013024 A1    Jan. 20, 2005

(30) Foreign Application Priority Data
Jul. 14, 2003    (DE) ................. 103 31 868

(51) Int. Cl.
    *G02B 7/182*    (2006.01)
(52) U.S. Cl. ............................. 359/879; 248/478
(58) Field of Classification Search ........ 359/871–879; 248/474–477, 479, 496
See application file for complete search history.

(56) References Cited

U.S. PATENT DOCUMENTS 6,183,098 B1 *    2/2001    Martin ................. 359/871

FOREIGN PATENT DOCUMENTS

DE    197 48 626 A1    5/1999

* cited by examiner

*Primary Examiner*—Euncha P. Cherry
(74) *Attorney, Agent, or Firm*—McNair Law Firm, P.A.

(57) ABSTRACT

A detent joint interconnecting first and second hinge pieces of vehicle mirrors. The detent joint includes an axis of rotation around which the hinge pieces are pivoted. A spring urged detent element carried by one of the hinge pieces for movement along a plane transverse to the axis of rotation and is movable in a direction of engagement. The detent element includes a surface with at least two protruding teeth. The hinge also includes a counter surface with complementary cuts formed therein which act with the teeth of the detent element to provide that at least two teeth of the detent element engage with the complementarily cuts in the counter surface to provide a detent position.

22 Claims, 4 Drawing Sheets

DETENT JOINT

CROSS REFERENCE TO RELATED APPLICATION

This application claims priority from a German Application filed Jul. 14, 2003 under Serial Number 10331868.2.

BACKGROUND OF THE INVENTION

The instant invention is directed to a detent joint, primarily for use with external mirrors of vehicles, but also with any external mirror which may require such a detent joint.

External mirrors of vehicles are generally fastened to the vehicle by means of one or several brackets.

Preferably swivel joints are employed to make it possible to pivot the mirror from the original position in which the mirror is set, essentially perpendicular to the side of the vehicle into a second position, in which the mirror stands essentially parallel to the side of the vehicle. This arrangement makes it a possibility to fold this mirror into the side of the vehicle during transport and parking decreasing its overall width or to fold the mirror back against the side in order to avoid, or at least diminish damage to the mirror upon collision with an obstacle as the case may be.

Advantageously, the swivel joints are designed in the nature of the detent joints, which engage the second position for at least the above-described reason—that means they oppose the clearly heightened resistance of the torque around the axis of rotation. Aside from that, still other detent positions can be made available which enable different basic positions while keeping the possibility for adjustments of the mirror pane relative to the mirror. In order to adjust the mirror's surface relative to his sitting position, the driver can initially bring the entire mirror to a suitable basic position and then adjust the angle of the mirror pane exactly for his position.

A similar arrangement is taught by EP 1 092 589. In this arrangement a first hinge piece, on which the mirror can be secured, as well as a second hinge piece for the attachment to the vehicle are provided. Both hinge pieces are joined together in such a way as to be rotated about a rod. This motion is accomplished by two arms of the first hinge piece which cooperate with second two arms of the second hinge piece, and a cylindrical part set in between. The cylindrical part is fixed to the second hinge piece by means of two clamp blocks that partially encompass its circumference. The cylindrical part has several evenly-spaced external notches on its circumference on the side turned toward the first hinge piece. A complementarily formed detent element is pushed back and set in the first hinge piece in the radial direction and is spring-forced in this direction, so that in each case one of the notches of the cylindrical part is engaged allowing the hinge pieces relative movement in the radial direction.

If the first hinge piece is turned around the second, the detent element is moved out of a notch against the resistance of the spring and, by the strength of the spring, is pushed into the next notch as soon as it lies directly across from the detent element, thus resulting in different detent positions. Because the cylindrical part is pivoted to the second hinge piece in different positions, the detent positions can be secured arbitrarily as regards the second hinge piece.

The primary drawback to this arrangement is that the detent joint consists of many pieces which results in costly manufacturing and unwanted tolerance of the joint as a result of the tolerance chains. Also, the stroke direction of the detent element must always lead radially through the axis of rotation, so that no disequalibriated torque is induced. This line of engagement of rotation of the axis-detent engagement-stroke of the detent element requires a relatively large space in the direction of the stroke. The larger lever arm controls the hinged position of the external mirrors which results in destabilization of the detent joint.

It is an object of the instant invention to provide a detent joint which is tolerance-free as much as possible and by which the rotation axis may be arranged outside of the line of engagement. A further object of the instant invention is to make an external mirror with a tolerance-free detent joint and in which the axis of rotation may be placed outside the line of engagement.

SUMMARY OF THE INVENTION

The above objectives are accomplished according to the present invention by providing a detent joint which consists of first and second hinge pieces which are connected to each other by the detent joint and where an axis of rotation is firmly secured to one of the two hinge pieces and around which the other of the two hinge pieces is pivoted. A detent element is set in a plane perpendicular to the rotation axis and is pushed back in the direction of engagement by a spring element. The detent surface includes at least two teeth protruding out of the surface. The second hinge piece has a counter surface formed with complementary notches which act to receive the at least two protruding teeth of the detent element engage in at least one detent position.

Because at least two teeth are always engaging with corresponding notches in the counter surface, these teeth are being pushed into the adjacent flanks by the opposing power component in the direction of the circumference, so that the detent joint is automatically centered in an essentially tolerance-free manner. To this, the teeth and the corresponding notches can be formed if desired to be essentially wedge-shaped.

Because the necessary torque required for positioning the mirror is distributed to several teeth, the impact on the single teeth is diminished which lessens wear and tear.

Automatic centering of the detent joint makes it also possible to arrange the rotation axis outside of the line of engagement.

In a preferred embodiment, the detent element is received in a slide bearing so that it can only be pushed back in the direction of engagement.

In one especially preferred embodiment, according to the invention, a forward and/or back stop is provided in the slide bearing in the direction of engagement. A forward stop prevents the detent element from being pushed out of its track by the spring element, while a back stop limits the maximal downward deflection of the spring.

The detent element always remains in the first piece under a spring pre-load due to forward and back stop limits in the slide bearing. The back stops may include a pin tightly secured to or integrally formed with the first hinge piece and positioned to slide in a slot formed in the slide bearing. This arrangement enables assembly of the hinge piece to include a pre-stressed detent element as a semi-finished part or, as a spare piece.

The detent joint, according to the invention preferably does not allow the direction of engagement to intersect with the axis of rotation. This arrangement provides a very compact short model in the direction of engagement which is free of intersections and undercuts respectively. Alternatively, in certain instances it may be desirable that the arrangement be constructed with the direction of engagement aligned to intersect with the axis of rotation. Advantageously, the axis of rotation may be arranged in the second hinge piece which carries the detent element in such a position that the hinge piece can be twisted in such a way that the detent element can be installed or removed. This additionally simplifies the assembly.

The spring element may comprise a flat spring that supports itself in the detent element and a first hinge piece, in such a way that it pushes the detent element in the direction of engagement. The detent element is advantageously pushed sideways to the direction of engagement in its track, which increases stability.

Likewise, the spring element can also include a coil spring or can be implemented by use of the detent element collectively as one piece.

In one especially preferred embodiment, the detent element contains more than two teeth.

In an embodiment that is just as especially preferred, the counter surface contains more than two complementarily formed notches, so that the at least two teeth of the detent element can engage in more than one detent position in the complementarily formed notches and, so doing, are able to implement several detent positions.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
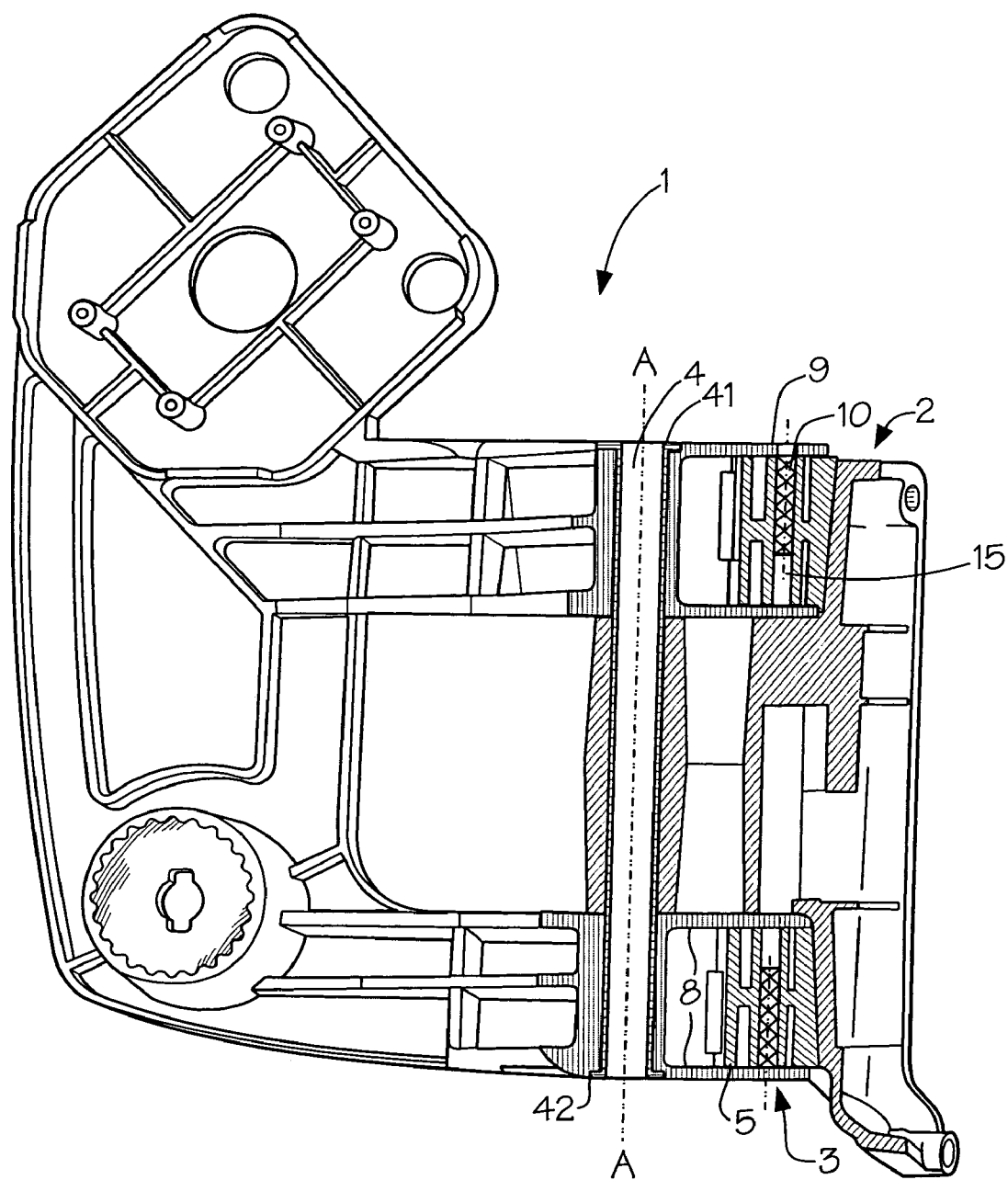
FIG. 1 is a cutaway rear view of an external mirror and detent joint according to the invention.

FIG. 1 shows an external mirror which is adapted to be attached to a vehicle and includes a detent joint. The external mirror includes a first hinge piece 1 attached in suitable manner with a second hinged piece 2. First hinge piece 1 is connected with the second hinge piece 2 by way of rod 4 which is set in the axial direction in bores 12, 14 as an axis of rotation. Rod 4 contains an over-flange 41 and an under-flange 42 which secures it with hinge pieces 1, 2. Alternatively, rod 4 can be set in position with bolts, adhesives, or other such means. With respect to the axis of rotation A, an essentially cylindrical front face surface 11 is provided with the inner surfaces of the upper and lower arms of first hinge piece 1.

Rod 4 also passes through second hinge piece 2, joining the first and second hinge pieces in such a way that they can be pivoted about the rotation axis A. Thereby, the first hinge piece 1 is engaged with the second hinge piece 2 in the area of the axis of rotation by rod 4 which extends in the axial direction, so that both hinge pieces are axially joined with each other.

Rod 4 can also be integrally formed with the first or second hinge piece. In this case, the track of the other arm, carried by the rod, can be formed from several pieces and can be assembled around the axis of rotation. Likewise, rod 4 may be attached to one of the hinge pieces; not only in axial but also in rotational direction, which, reduces the tolerance of the joint. Upper and lower slide bearings 8 are formed in the arms of first hinge piece 1 which receive detent elements 5 in such a way that they can be pushed axially of the arms as seen in FIG. 2, but do not interfere with the axis of rotation.

The upper and lower arms of first hinge piece 1 form slide bearings 8 including a slot 9 of selected length on their top and undersides, respectively. Detent elements 5 are positioned in bearings 8 under or over said slots 9 respectively. Bores 15 are formed in detent elements 5 in position to lie beneath or above slots 9. Pins 10 are provided to pass through slots 9 and engage in bores 15. Each pin 10 may be slightly tapered allowing the detent element to be more axially tolerance-free. Slots 9 along with pins 10 form a forward and back stop with a primary function of controlling the length of movement of the detent elements 5 back in the direction of engagement with counter surface 7. The detent element 5 is forced in the direction of engagement with counter surface 7 by a flat spring 6 arranged with a preloaded force. The flat springs 6 are supported in slits 16 formed in the sidewalls of the detent element 5. This structure beneficially reduces the tolerance necessary of the detent joint.

A nib 18 in the slide bearing 8 acts to deform the flat spring 6 providing the preloaded force which maintains force on pin 10 and detent 5 in the direction of the forward limit of the stop and second hinge piece 2 in each of the forward and back stop positions of slot 9.

Figure 2:
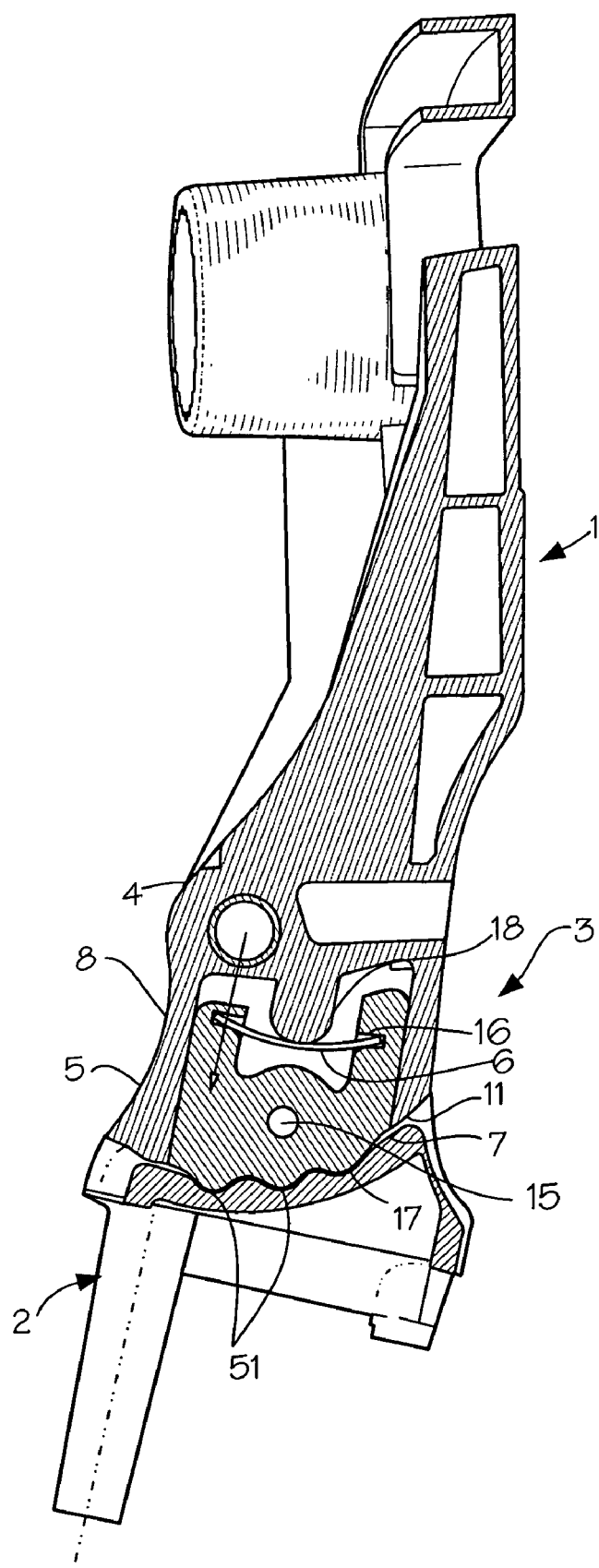
FIG. 2 is a cutaway top view of the external mirror and detent joint.

Each detent element 5 includes three teeth 51 which, as seen in FIG. 2, are essentially formed wedge-shaped. The second hinge piece 2 carries an essentially arcuate counter surface 7 contoured about the rotation axis A and including complementarily notches 51. This structure allows the second hinge piece to be advantageously formed of fewer assembly pieces than conventional hinge pieces.

Springs 6 urges the detent elements 5 forward in the direction of engagement with counter surface 7. The cuts or notches 17 of the counter surface 7 lie directly across from the teeth 51 so that the teeth are pushed into the notches and held there. This way detent joint 5 is engaged in one detent position.

With the application of a torque around the axis of rotation, the teeth 51 are pushed out against the pressure of the flat spring 6 in the direction toward the back, out of the notches 9 allowing hinge pieces 1 and 2 to be moved relative to the axis of rotation. As soon as the teeth 51 move into position directly across from different notches in the counter surface 7, teeth 51 are urged into these notches by the force of springs 6 and held there. This way, detent joint 5 is engaged in another detent position and hinge pieces 1 and 2 are held in different relative positions.

Advantageously, the flanks of the teeth generate a torque as soon as they move into the corresponding notches of the counter surface until they are completely engaged in the notches. This allows the detent joint to centralize itself automatically, even when the line of engagement does not intersect the rotation axis.

Figure 3:
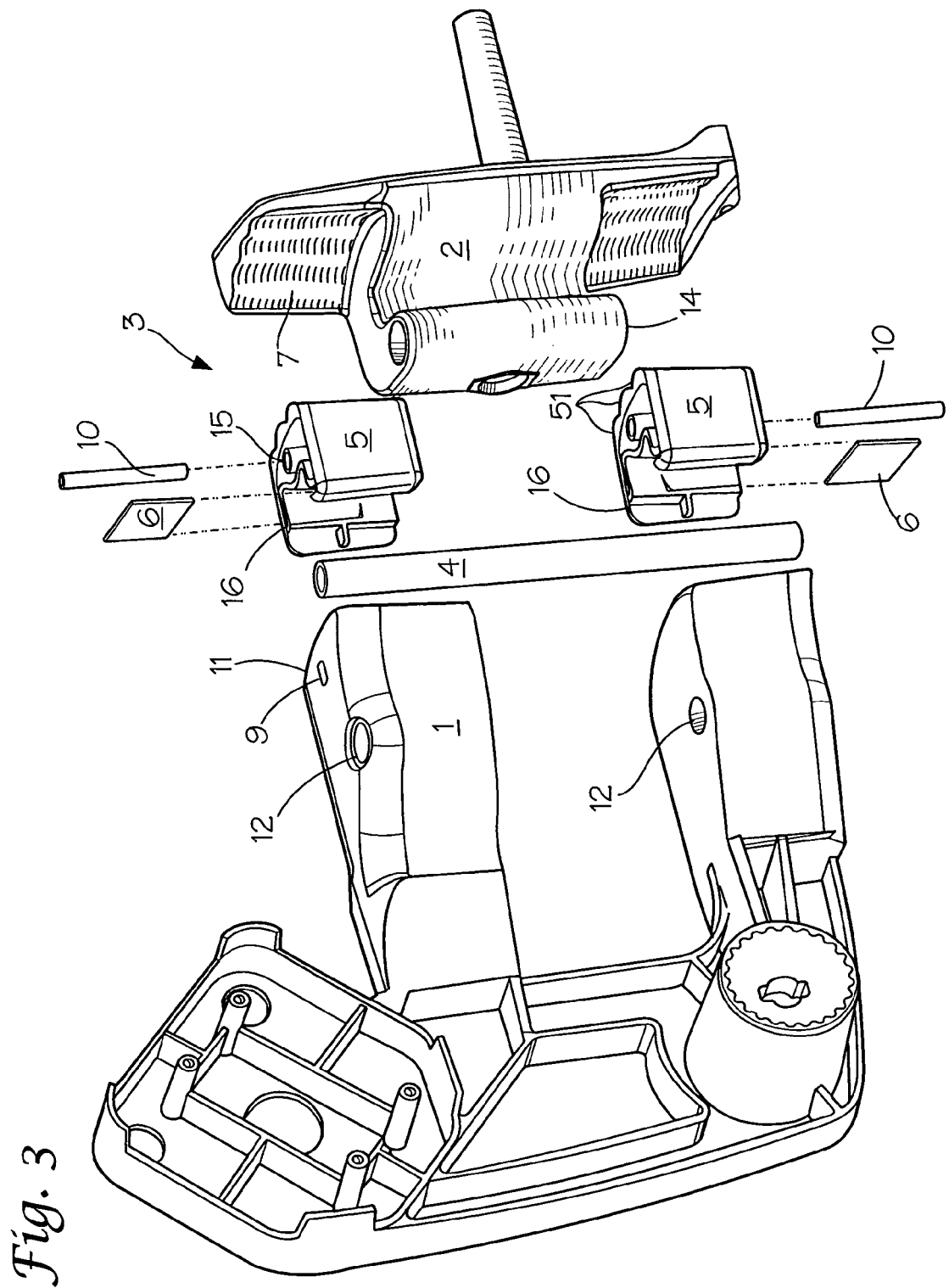
FIG. 3 is an exploded rear perspective view.
Figure 4:
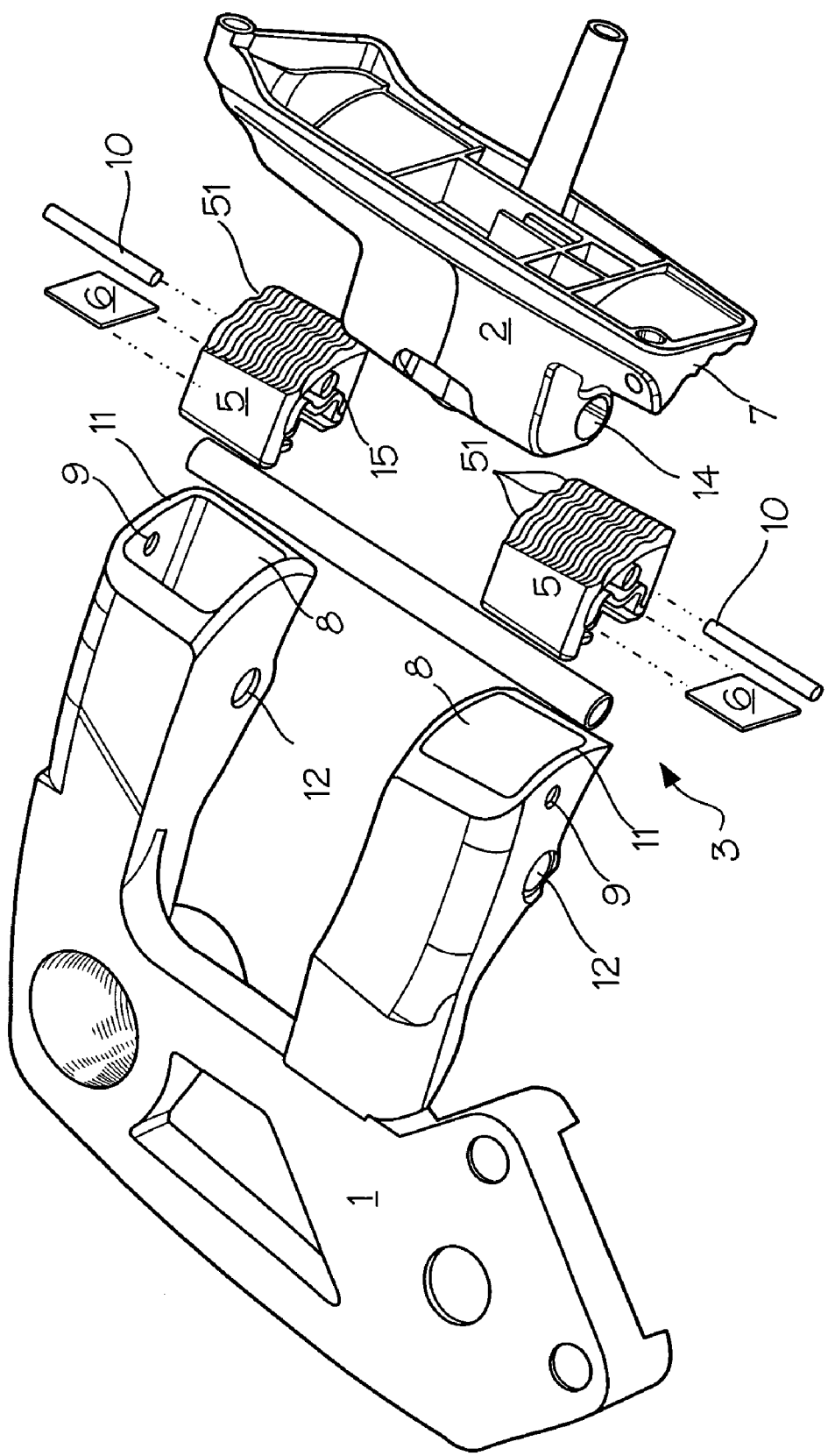
FIG. 4 is an exploded front perspective view.

In this way a tolerance-free detent joint is set according to regulations. As displayed in the example according to FIGS. 1–3, the detent joint moves along an axis perpendicular to and laterally spaced apart from the rotation axis so that the rotation axis A may advantageously be set outside the line of engagement resulting in a compact, short model in the direction of engagement.

To the assembly, either the detent elements 5 with the flat springs 6 can be inserted in the slide bearing and secured by means of pins 10. Then this semi-finished part can simply be axially fixed to the second hinge piece, by driving rod 4 through both hinge pieces 1 and 2.

Hinge pieces 1 and 2 could then be pivoted about the rod 4. Subsequently, because of the advantageous assembly of the rotation axis, both hinge pieces can be pivoted so far that the slide bearing 8 of the first hinge piece 1 is spaced from counter surface 7 and is exposed. In this position, the detent elements 5 along with flat springs 6 could be installed and then secured by the pins 10. The first hinge piece 1 is pushed back into an engaged position by which the front 11 of the first hinge piece 1 lies directly across from the counter surface 7 of the second hinge piece.

While a preferred embodiment of the invention has been described using specific terms, such description is for illustrative purposes only, and it is to be understood that changes and variations may be made without departing from the spirit or scope of the following claims.

What is claimed is:

1. A detent joint for use with mirrors having first and second hinge pieces, said detent joint interconnecting said first and second hinge pieces about an axis of rotation:
   a detent element carried by one of said first and second hinge pieces, said detent element being secured in a plane transverse to the axis of rotation and movable along an axis in a direction of engagement;
   a spring element carried by said one hinge piece exerting a force on the detent element in the direction of engagement;
   said detent element having an engagement surface with at least two protruding teeth;
   a counter surface carried by a second of said first and second hinge elements which includes a plurality of cuts for determining at least one detent position; wherein,
   when the at least two teeth of the detent element are engaged with at least two of said cuts in the counter surface, said detent joint locks said first and second hinge elements in said one detent position.

2. The detent joint according to claim 1, including a slide bearing supporting said detent element for movement in the direction of engagement.

3. The detent joint, according to claim 2, wherein said slide bearing includes a stop.

4. The detent joint, according to claim 3, wherein said stop comprises a slot in the slide bearing.

5. The detent joint, according to claim 4, wherein said stop further includes a bore formed in the detent element adjacent said slot and a pin carried in said bore extending through said slot wherein movement of the detent element in the engagement direction is limited.

6. The detent joint, according to claim 1, wherein said axis of said direction of engagement is laterally spaced apart from the axis of rotation.

7. The detent joint, according to claim 1, wherein said axis of rotation is positioned relative to the direction of engagement and the detent element to allow said one hinge piece to be rotated relative to said second hinge piece into a position allowing said detent element to be inserted into and removed from said one hinge piece.

8. The detent joint, according to claim 1, including a rod secured with the first hinge piece forming said axis of rotation.

9. The detent joint, according to claim 1, wherein the spring element comprises a flat spring carried between the detent element and the first hinge piece, said spring acting to push the detent element in the direction of the engagement.

10. The detent joint, according to claim 1, wherein the spring element comprises a coil spring carried between the detent element and the first hinge piece, said spring acting to push the detent element in the direction of the engagement.

11. The detent joint to claim 1 wherein the counter surface has more than two of said cuts.

12. A mirror mount for use with vehicles comprising:
    a first hinge piece for carrying a mirror having a first end;
    a second hinge piece for securing with a vehicle having a first end, said first ends forming a pivot along a first axis between said first and second hinge pieces;
    a detent element carried by one of said first and second hinge pieces, said detent element having an engagement surface and being movable along a second axis offset from said first axis;
    a counter surface carried by the other of said first and second hinge pieces, said counter surface being adapted to engage with said engagement surface;
    a spring carried by said detent element, said spring urging said detent element along said second axis toward said counter surface; wherein,
    when said first hinge piece is rotated about said first axis into selected positions relative to said second hinge piece said detent element is moved along said second axis engaging between said contoured surface and locking said first and second hinge pieces in said selected positions.

13. The mirror mount of claim 12 wherein said pivot allows said first and second hinge pieces relative movement into a position in which said detent element may be removed from said one of said first and second hinge pieces.

14. The mirror mount of claim 12 wherein said one of said first and second hinge pieces includes a bearing surface for supporting said detent element for movement along said second axis.

15. The mirror mount of claim 12 including limit means carded by said one of said first and second hinge pieces and said detent element said limit means limiting movement of said detent element along said bearing surface.

16. The mirror mount of claim 12 wherein said second axis is perpendicular of said first axis.

17. An external mirror mount comprising:
    a first hinge piece carrying a mirror and having a first end;
    a second hinge piece for securing with a vehicle having a first end, said first ends being adapted to form a pivot along a first axis between said first and second hinge pieces;
    a counter surface carried by one of said first and second hinge pieces;
    a slide bearing formed in the other of said first and second hinge pieces, said slide bearing being arranged along a second axis transverse of said first axis;
    a detent element carried in said slide bearing and movable along said second axis, said detent element having an engagement surface adapted to engage with said counter surface to position said first and second hinge pieces in selected positions;
    a stop associated with said other of said first and second hinge pieces and said detent element for limiting movement of said detent element along said second axis in said slide bearing; and
    spring means carried by said detent element acting with said other of said first and second hinge pieces to urge said detent element in a direction toward said first end of said other of said first and second hinge pieces.

18. The external mirror mount of claim 17 wherein said detent element includes a pair of spaced slits which receive opposed ends of said spring.

19. The external mirror mount of claim 18 wherein said slide bearing includes a nib, said nib being positioned to deform said spring providing force urging said detent element toward said one end.

20. The external mirror mount of claim 17 wherein the other of said first and second hinge pieces includes a pair of slide bearing each carrying a detent element and arranged along a common plane.

21. The external mirror mount of claim 17 wherein said counter surface includes a plurality of notches and said detent element includes a plurality of teeth, wherein a plurality of said teeth are adapted to be engaged in a plurality of said notches positioning said first and second hinge pieces in desired selected positions.

22. The external mirror mount of claim 21 wherein there are two of said teeth and in excess of two of said notches.

* * * * *